Oct. 23, 1945.  J. R. CORNELIUS  2,387,496
METHOD OF AND MEANS FOR MAKING FINE MEASUREMENTS
Filed March 21, 1944  2 Sheets-Sheet 1

Inventor
James R. Cornelius
by Babcock & Babcock
Attorneys

Oct. 23, 1945.  J. R. CORNELIUS  2,387,496

METHOD OF AND MEANS FOR MAKING FINE MEASUREMENTS

Filed March 21, 1944  2 Sheets-Sheet 2

Inventor
James R. Cornelius
by Babcock & Babcock
Attorneys

Patented Oct. 23, 1945

2,387,496

UNITED STATES PATENT OFFICE 2,387,496

METHOD OF AND MEANS FOR MAKING
FINE MEASUREMENTS

James Richard Cornelius, Coventry, England

Application March 21, 1944, Serial No. 527,508
In Great Britain September 22, 1943

6 Claims. (Cl. 177—351)

The object of the present invention is to provide an improved method of and means for making extremely fine measurements including the detection of extremely small differences or variations in the dimensions of an object, and means whereby such measurements and differences or variations may be visually observed and/or recorded to the accuracy of one millionth of an inch or even finer.

Present methods of making fine measurements rely mainly upon the use of mechanical magnification, usually by means of a system of levers, the minute movement produced at the operating end of the first lever being converted into a relatively large movement at the indicating end of the last lever. Notwithstanding the remarkable accuracy which can be obtained with such mechanical instruments they are necessarily dependent upon the accuracy of their bearings whilst the stresses which are set up in the mechanism have also to be taken into account. For these and other reasons it is practically impossible to produce a mechanical measuring instrument capable of accurately recording or indicating such minute dimensions or differences as one millionth of a millimetre. In addition to the limitations of the mechanical instrument itself the detection thereby of fine measurements entails extremely delicate operation and can only be performed in specially prepared places where air currents, vibrations, and temperature differences are eliminated.

According to this invention the method of making fine measurements and for detecting extremely small differences in dimensions is distinguished from existing methods and characterized in that it involves the application of known electrical phenomena and depends upon the effect produced in an oscillating electric circuit by the movement of one and/or another of certain elements thereof due to the differences in dimension between the object being measured and that of a given dimension to which the improved measuring instrument is set, or to extremely fine dimensional differences arising from the effect of temperature and/or pressure on the object under observation.

These dimensional differences may be transmitted to the said element or elements either directly or indirectly.

In the former case the means employed for carrying out the improved method includes a measuring head which is responsive to said differences by direct contact with the object under observation and with one or the other or both of said elements, a frequency sensitive electric circuit, a frequency producing unit connected with said circuit, and a secondary frequency responsive circuit capable of responding to a definite width of frequency band produced by the injection of the first frequency as modified by the movement of said element or elements into the said secondary frequency responsive circuit.

The resulting frequency induced into the secondary frequency responsive circuit is then injected into a series of amplifying units, each consisting of frequency responsive circuits and amplifying thermionic valves in order to amplify the magnitude of the signal produced in the initial circuit. A circuit in the final amplifying unit is arranged to emit a signal of sufficent amplitude but with such amplitude limited to definite proportions. This signal is then injected into a discriminating circuit coupled with a rectifying valve or unit the object of which is to determine the value of the variation of the element in the measuring head in terms of the potential induced in the discriminating circuit and due to the variation in the frequency of oscillations produced in the initial measuring unit as amplified by the successive amplifying units. The potential thus produced can be employed to operate a voltage operated indicator, or further amplified to operate a current or voltage operated recording device.

Figure 1:
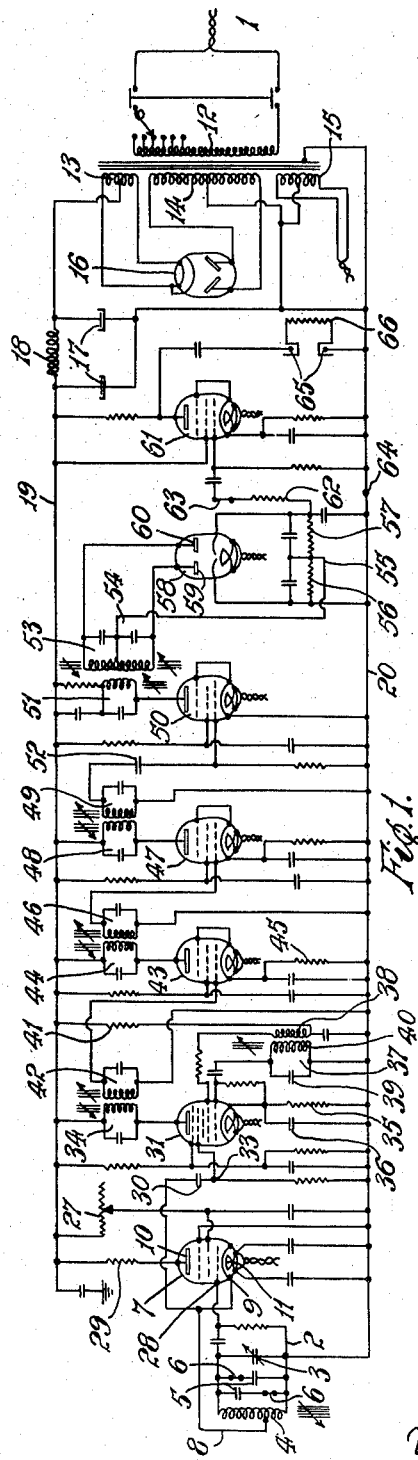
Figure 1 is a schematic diagram illustrating one form of the improved measuring apparatus in which the operating element is the capacitance of the oscillatory circuit.

As is well known to those skilled in the art a closed circuit including inductance, capacitance and resistance in definite relations will, under certain conditions, oscillate at a definite frequency depending upon the values of the three elements referred to. It can also be shown that a variation in either the capacitance or the inductance will modify the frequency at which the system oscillates. In certain circumstances a modification of both capacitance and inductance in such a circuit will produce a greater or lesser modification of the said frequency according as to whether the variation of the one is identical with and opposite to the variation of the other, or vice versa. These phenomena which are utilised in the present invention for the purpose of making extremely fine measurements or for detecting extremely small differences in dimensions, are well understood in the art of radio telephony.

Referring to the drawings which show alternative ways in which the phenomena referred to is utilized for the purposes of the present invention, 2 represents a closed circuit including a variable condenser or capacitance 3 and a variable inductance 4. Additional condensers such as 5 can be included in the circuit and brought into use as and when required by means of the switches 6. For the purposes of the present description these extra condensers are assumed to be cut out.

If the capacity of the condenser 3 at one position is 150 micromicrofarads and the inductance 4 has a value of 10 microhenrys it can be shown by mathematical calculation that the said circuit will, under certain conditions, oscillate at about 4,000 kilocycles per second. If now the capacity of the condenser 3 is modified as, for instance, by varying the distance between the plates thereof the capacitance will be increased or decreased by an amount which will depend upon the amount of said variation. Assuming as aforesaid that the basic frequency in the closed circuit is 4,000 kilocycles per second and that the displacement of one of the plates is one millionth of an inch, it can be proved that the frequency of oscillations in the said circuit will be varied by about 750 cycles per second.

In order to produce oscillations in the circuit 2 certain provisions are necessary, such as the inclusion of a valve 7 and of the maintaining coil conductor 8 connected to a suitable point on the inductance coil 4 and to the cathode 9 of said valve. The valve 7 must also be supplied with high tension direct current (H. T.) at its anode 10 and cathode 9 and heating current must be supplied to the heater filament 11. These currents may be obtained from a source which may either be extraneous to the apparatus or included therein, as shown in the diagram Figure 1, and consist of a transformer comprising the primary coil 12, secondary coils 13, 14 and 15, and a rectifying valve 16 together with smoothing and reservoir condensers 17 and chokes 18, the positive and negative H. T. conductors being represented by 19 and 20 respectively.

Figure 3:
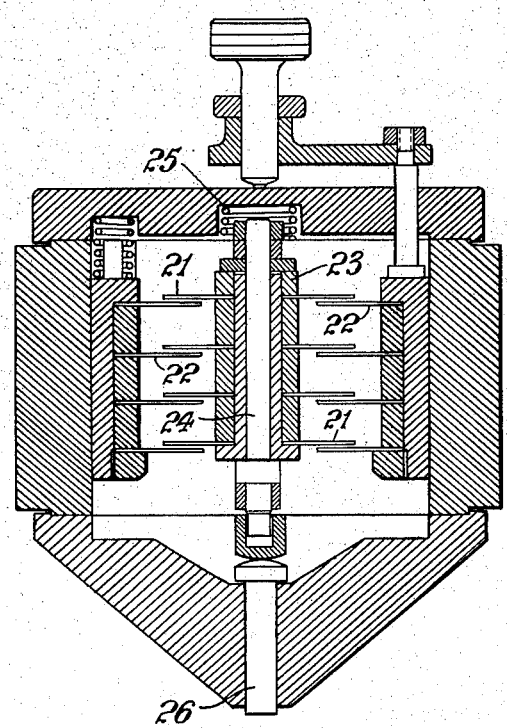
Figure 3 is a detail view in section of the variable capacitance element included in the oscillatory circuit.

In the arrangement shown in Figure 1 it is assumed that the operating element is the capacitance or condenser 3. one construction of which is shown in detail and on a larger scale in Figure 3, 21 being the movable plates and 22 the relatively fixed plates. The movable plates, as shown, are carried by a sleeve 23 mounted on a spindle 24 which is axially movable to vary the distance between the two series of plates against the action of a return spring 25 which holds the foot of the said spindle in contact with the movable anvil 26 in the head of the measuring instrument, see Figure 5.

When the valve 7 is supplied with high tension current at definite potential values at the anode 10 through the resistor 29 and at the cathode 9 by way of the closed circuit 2 and conductor 8, the capacitance value of the said circuit will be caused to oscillate and will maintain these oscillations at a definite level. There will, therefore, be a definite frequency of oscillations at points 9 and 28 of valve 7, and in an amplified state at the anode end of resistance 29, if required. The oscillations available in the circuit 2 are also passed on to the condenser 30 which constitutes the frequency connector between valve 7 and valve 31. It follows, therefore, that any variation in the spacing of the plates 21, 22 of the condenser 3 will be passed on after the frequency has been established and maintained by the circuit 2 to the grid of valve 31 through the condenser 30 and coupling 33.

The valve 31 is also connected at the anode with the main H. T. conductor 19 through the circuit 34 and at the cathode with the main H. T. conductor 20 by the resistor 35 and de-coupling condenser 36. Since electrons are flowing from cathode to anode in this valve and a grid bias exists, amplification will take place and the signal from circuit 2 will be amplified in this valve. Two other connections are, however, included in this valve which considerably modify the signals, viz: the first grid circuit 37 and the second grid circuit 38. The former is a tuned circuit comprising a condenser 39 and an inductance coil 40 the values of which are such as to maintain a fixed frequency of oscillation at 4500 kcps. The coil of the second grid circuit 38 is fed from the H. T. line 19 through the resistance 41 and maintains the oscillations induced in the first grid circuit 37 by normal reaction inductance. Since the electron flow from cathode to anode of valve 31 must pass both the first and second grids thereof before reaching the fourth grid into which the oscillations from circuit 2 are injected, it is obvious that the oscillations of the second grid circuit 38 will mix with those of circuit 2. It will also be obvious that if, as has already been assumed, the frequency of circuit 2 is adjusted to 4000 kcps. the output from the valve 31 at the anode will include, inter alia, the frequencies of 4000 kcps., 4500 kcps. and 500 kcps. The anode feed to valve 31 includes the circuit 34 which comprises a capacitance and an inductance which are tuned to a frequency of 500 kcps. It can be demonstrated that within certain limits all other frequencies in the circuit of valve 31 will be rejected by circuit 34 except those within the band of 500 kcps. which will be passed on to the secondary circuit 42 inductively coupled to circuit 34. It can also be proved that, according to the relative impedance values of circuits 34 and 42 and their capacitance and inductance, a magnification of the injected signal or current at 34 will be available at 42. It is further evident that any variation in the spacing of the plates 21, 22 of condenser 3 will result in a variation of the frequency of the current available at considerably increased strength in the positive lead or output conductor of the inductance coil in circuit 42.

The signal induced in circuit 42 is now passed to the grid of valve 43 which is fed from the H. T. conductor 19 through the tuned circuit 44 and the bias resistance 45. The value of the latter is such as to provide the optimum potential difference between grid and cathode for the amplification required of the valve. The various screen resistors, etc. are also of optimum value for the correct working of this valve as an amplifier. The signal from circuit 42 is, therefore, passed onto the circuit 44 with the optimum amplification and since this circuit with its secondary coil 46 is tuned to a definite band of frequency passage all signals that may have infiltrated but are not of the correct frequency are rejected. The said circuit is a normal amplification and intermediate frequency band pass filter for wanted frequencies.

The purity of the signal can be improved, if required, by further amplification, as by means of valve 47 and filters 48, 49. The signal now passes to the valve 50 which is also fed from the H. T. conductor 19 through the tuned circuit 51 and the cathode connection direct to the negative H. T. conductor 20. This valve 47 is operated in the saturated condition and, as such, will limit the amplitude of all signals injected via coupling condenser 52 to the grid. All signals passing via the anode to the tuned circuit 51 will be approximately identical in amplitude and strength. This is essential since the element to be measured is the modulation in frequency and not in the amplitude of the oscillations set up in circuit 2. The necessary precautions to be observed for the valve 50 as regards grid bias and anode/cathode potential for operating in the saturated condition are, therefore, to be applied. The current injected into the circuit 51 will accordingly be in the region of 500 kcps. and of constant amplitude modulation.

Two secondary tuned circuits 53, 54 are, as shown, inductively coupled to filter 51 and these are tuned to the maximum and minimum frequency that it is intended circuit 2 should vary. Thus, if the maximum dimensional variation required of the anvil 26 will produce a frequency variation in the circuit 2 of 20,000 cycles per second, the circuit 54 will be tuned with its inductance and capacitance to resonate at 520 kcps., whilst circuit 53 will be tuned to resonate at a frequency of 480 kcps., thus a band of 40,000 cycles per second will exist between the maximum and minimum indicated dimensions. The inductive value of two tuned circuits is known to be at its maximum when their frequencies are identical but the inductive coupling between them will be reduced by any difference between their respective frequencies. For example, if two coils are tuned to exactly 500 kcps. and their coupling is relatively loose, they will resonate and the current in the primary will be induced in the secondary with the maximum effect and if the frequency of one is disturbed and varied from the other the inductive powers will be decreased and greater losses will be observed. Also, if one coil be tuned to 500 kcps., for example, and two other coils are tuned to exactly 20,000 cycles per second plus and minus respectively, the induced current in each coil, all other elements being equal, will be identical. Also, if the frequency of the primary coil is increased gradually from 500 kcps. to 520 kcps. the induced current in the plus and minus coils will be such that the plus coil will be at maximum response to the primary whilst the minus coil will be practically out of tune and non-responsive. The opposite effect would result if the frequency of the primary had been reduced to 480 kcps. From these observations it follows that any variation in the frequency of circuit 2 will produce a corresponding variation in the circuit 51 and will also cause an increase in the inductive coupling of the said circuit with one of the circuits 53, 54. These latter circuits are connected to the common conductor 55 situated midway in the resistance network 56, 57. The other connections from the circuits 53, 54 are connected to the anodes of valve 58. The cathodes 59, 60 of this valve are connected to the negative H. T. line 20 and to the grid of the output power valve 61 respectively. The resistances 56, 57 are arranged and calculated to suit the voltages developed in the circuits 53, 54 which voltages are developed therefore across the ends of 56 and 57. Assuming that circuit 53 is frequency responsive to filter 51, the full voltage developed in the latter will, therefore, be induced in the coil of circuit 53 and will, in order to be developed across resistance 56, have to pass through valve 58 and be rectified into direct current. Since the disposition of the coil 54 and cathode/anode of valve 58 together with the resistance 56 determine the value of the rectified current and also its nature, it is obvious that the current will be negative to the H. T. negative line 20. If the coil of circuit 53 had been frequency responsive to circuit 51 then the opposite would take effect and the induced current, after rectification, would have been available at point 62 as a positive voltage to H. T. line 20. It follows, therefore, that a variation of the frequency obtained in circuit 2 will become apparent after amplification, discrimination and rectification as a positive or negative direct voltage available at the terminals 63 and 64 for the operation of a visual indicator to denote the magnitude of the necessary movement of the plates 21 of the condenser 3 to effect such variation of frequency. Since, however, the voltage available at points 63 and 64 is very feeble it would not be possible to operate a recorder from these points, but by injecting this voltage into a suitable power valve, such as 61, it is possible to utilise this voltage to modulate the output of such a valve sufficiently to operate a suitable recording mechanism. This could be connected to the points 65 in place of the load 66.

Figure 2:
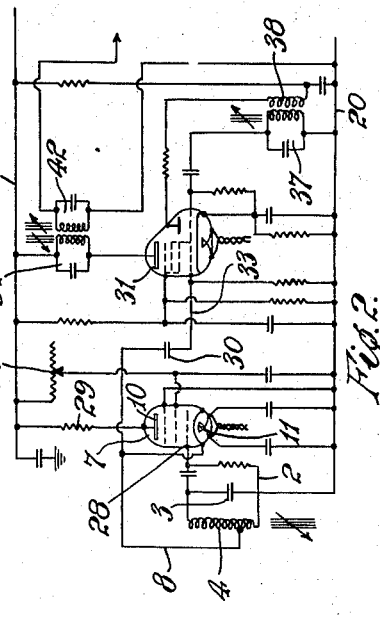
Figure 2 represents diagrammatically the measuring and detecting part of the apparatus in which the operating element of the oscillatory circuit is the inductance.
Figure 4:
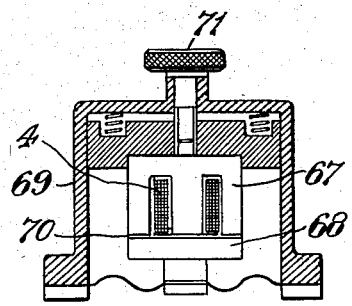
Figure 4 is a detail view in section of the variable inductance element of the oscillatory circuit.

All that has been described heretofore concerning the variation in capacitance of the condenser 3 is equally applicable to variation in the inductance of coil 4. In this case the measuring and detecting part of the apparatus may be as represented diagrammatically in Figure 2, in which those parts corresponding with similar parts in Figure 1 are designated by similar reference characters. Where in this case the operating element is, as aforesaid, the coil 4, a construction of this element is shown in detail in Figure 4, in which it will be seen that the said coil is mounted in an enclosing core comprising the two parts 67, 68 arranged within a casing 69 which may form part of the measuring head. The gap 70 between the two parts of the core may be initially set by means of the adjusting screw 71. The core part 68 is responsive to movement of the movable anvil of the measuring head either directly or indirectly. Any variation in the width of the gap will modify the inductance of coil 4 and hence produce a modification of the frequency of oscillations in the circuit 2. The operation of the circuit in Figure 2, if substituted for the corresponding circuit shown in Figure 1, will, therefore, produce identical results for identical movements of the said core part 68 and of the plates 21 of condenser 3, in the circuit 2.

Figure 5:
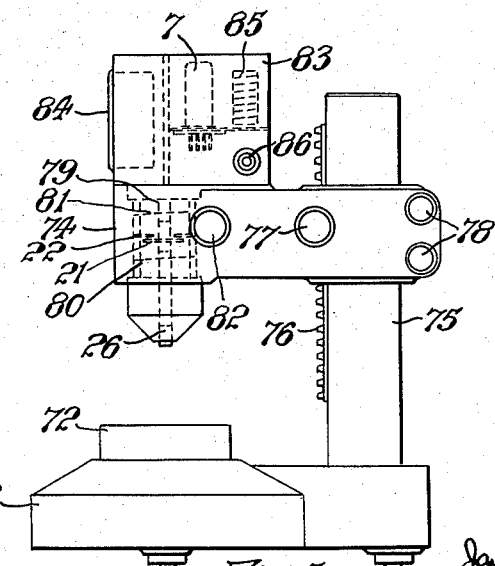
Figure 5 is a view in side elevation of one form of measuring instrument embodying the present invention.

An example of the application of the present invention to a measuring machine of the comparator type is shown in Figure 5, in which 26 represents the movable anvil and 72 the fixed anvil which is rigidly mounted in the base 73. The measuring head 74 is slidably mounted in a column 75 carried by the said base and is adjustable thereon by the rack 76 and a pinion rotated by the knob 77 and locked by means of the screw 78. The movement of the anvil 26 responsive to variations in the dimensions of the work-piece is communicated to the condenser plate 21 which is mounted on two flexible diaphragms 79 and 80. The fixed condenser plate 22 is mounted on a cam ring 81 which is adjustable by means of the worm gear 82. A casing 83 above the head carries the indicator 84 and the oscillator and mixing valves one of which is indicated at 7. One of the frequency coils is shown at 85. The connection 86 permits the necessary current for the valve heaters and the valve and circuit elements to be carried from the amplifier unit to the measuring head.

In using the instrument the head 74 is adjusted for approximate height on the column 75 to permit contact between the work-piece to be measured and the anvils 26 and 72. The anvil 26 is free to locate itself on the work-piece and the cam ring 81 is adjusted by the knob of the worm gear 82 in order that the two plates 21, 22 of the condenser obtain the correct capacity to produce the frequency necessary to deflect the needle of the indicator 84 to zero position on the scale. The work-piece being removed subsequently, permits the same needle deflection to be obtained by the use of standards and the corresponding dimensions obtained. If the standard piece is shorter than the work piece, the resultant voltage developed across terminals 63 and 64 will have a given polarity and the needle of the indicator will deflect in one direction from its zero position to indicate that the standard piece is too short. If the standard piece is longer than the work piece, the potential developed across terminals 63 and 64 will be of opposite polarity and the needle of the indicator will deflect in the opposite direction from its zero position to indicate that the standard piece is too long. Where the standard piece is of the same length as the work piece, the needle will remain in its zero position. Where the instrument is used for checking work pieces against a standard dimension, a standard piece of the correct dimension is inserted in the measuring head and the cam ring is adjusted until the indicator is at zero position; in the subsequent measurement of work pieces, if a piece is too short this fact will be indicated by deflection of the needle in one direction from its zero position, and the opposite direction of deflection of the needle will indicate that the work piece is too long.

In the foregoing description movement of the condenser plates 21 or of the core member 68, as the case may be, to produce variations in the frequency of the oscillations in circuit 2 are obtained by direct or straight line contact between the said plates 21 or core part 68 and the work-piece under observation. The application of the invention is not, however, confined to this arrangement and an initial magnification in the movement of the said plates or core part may, if desired, be obtained by the interposition between the movable anvil 26 and the spindle 24 carrying the plates 21, or between the said anvil and the core part 68, of suitable mechanical or hydraulic means, such as a lever in the one case or a column of liquid in the other.

I claim:

1. In a precision measuring indicator the combination of an oscillator generating a wave of fixed frequency, a second oscillator for generating a wave having a frequency normally differing from the frequency of said first oscillator by a predetermined difference frequency, means for combining said waves to produce a beat wave of said difference frequency, a distance measuring device including a movable element for varying the frequency of said second oscillator in accordance with the position of said element and being operative to vary said beat frequency above and below said normal difference frequency, a pair of tuned circuits, one tuned to a frequency higher than said normal difference frequency and the other to a frequency lower than said normal difference frequency, means for supplying said beat wave to said tuned circuits, means for rectifying the currents in said tuned circuits to produce direct current voltages, and an indicator circuit having said direct current voltages included therein in opposing relation.

2. A precision measuring indicator according to claim 1 and including an amplitude limiting device inserted between said wave combining means and said tuned circuits to eliminate amplitude variations in said beat wave.

3. In a precision measuring indicator, the combination of an oscillator generating a wave of fixed frequency, a second oscillator having a variable frequency determining circuit, a distance measuring device for varying the frequency of said second oscillator over a frequency range displaced from the frequency of said first oscillator, means for combining the waves from said oscillators to produce a beat wave having a range of frequency corresponding to the difference between the frequencies of said oscillators, a transmission path including a tuned circuit tuned to a frequency at one end of said beat frequency range, a second transmission path including a tuned circuit tuned to a frequency at the other end of said beat frequency range, means for supplying said beat wave to said transmission paths, means for developing two direct current voltages having amplitudes which are proportional respectively to the amplitudes of the beat waves flowing in said transmission paths, and an indicator circuit including means for combining said direct current voltages in opposing relation, said direct current voltages being adjusted to have equal values at an intermediate value of the frequency range of said beat wave.

4. A precision measuring indicator according to claim 3 and including an amplitude limiting device inserted between said wave combining means and said transmission paths to eliminate amplitude variations in said beat wave.

5. In a precision measuring indicator, the combination of a distance measuring device having a movable element movable over a predetermined range, means controlled by said movable element for generating an electric wave having a frequency variable over a predetermined range, a transmission path including a tuned circuit tuned to a frequency at one end of said frequency range, a second transmission path including a tuned circuit tuned to a frequency at the other end of said frequency range, means for supplying said wave to said transmission paths, means for developing two direct current voltages having amplitudes which are proportional respectively to the amplitudes of the waves flowing in said transmission paths, and an indicator circuit including means for combining said direct current voltages in opposing relation, said voltages being adjusted to have equal values at an intermediate value in said frequency range.

6. Apparatus for indicating variations in a physical dimension above and below a predetermined value which comprises, means for generating a wave of fixed frequency, means for generating a wave having a frequency determined by the value of said dimension, means for combining said waves to produce a beat wave having a frequency equal to the difference between said frequencies, means for transmitting a portion of said beat wave over a transmission path which is increasingly selective to frequencies higher than the frequency of the beat wave corresponding to said predetermined dimension, means for transmitting a portion of said beat wave over another transmission path which is increasingly selective to frequencies lower than said beat wave for said predetermined dimension, means for rectifying the currents transmitted over said paths to produce direct current voltages, means for combining said direct current voltages in opposing relation, and means utilizing the resultant direct current voltage for indicating the direction and amount of deviation of the dimension from said predetermined value.

JAMES RICHARD CORNELIUS.